United States Patent

Leger

[15] 3,670,999
[45] June 20, 1972

[54] PARACHUTE FORCE TRANSFER MECHANISM WITH BUILT-IN OPEN LINK

[72] Inventor: James E. Leger, Enon, Ohio

[73] Assignee: The United States of America as represented by the Secretary of the Air Force

[22] Filed: Nov. 5, 1970

[21] Appl. No.: 87,216

[52] U.S. Cl. ................................................244/137
[51] Int. Cl. ..................................B64c 1/22, B64d 1/08
[58] Field of Search ......................244/137, 151, 136, 138

[56] References Cited

UNITED STATES PATENTS

| 3,398,917 | 8/1968 | Grabe | 244/137 |
| 3,424,410 | 1/1969 | Galaup | 244/137 |

Primary Examiner—Milton Buchler
Assistant Examiner—Carl A. Rutledge
Attorney—Harry A. Herbert, Jr. and Richard J. Killoren

[57] ABSTRACT

A parachute extraction line force transfer mechanism having a first link connected to the extraction line of an extraction parachute and a second link connected to the extraction line of the main parachute. A crank arm engages tripping fixture on the floor of the aircraft to turn a shaft with cams which operate a mechanism to interconnect the two links and to release the interconnected links so that the extraction parachute can deploy the main parachute. A solenoid which can be energized by the load master acts to release the link connected to the extraction parachute without releasing the link connected to the main parachute. Disconnect type terminal blocks act to connect the solenoid of only the aft most platform to the power supply to prevent the releasing of the extraction parachute link without the main parachute link after the platform has moved a predetermined distance.

6 Claims, 23 Drawing Figures

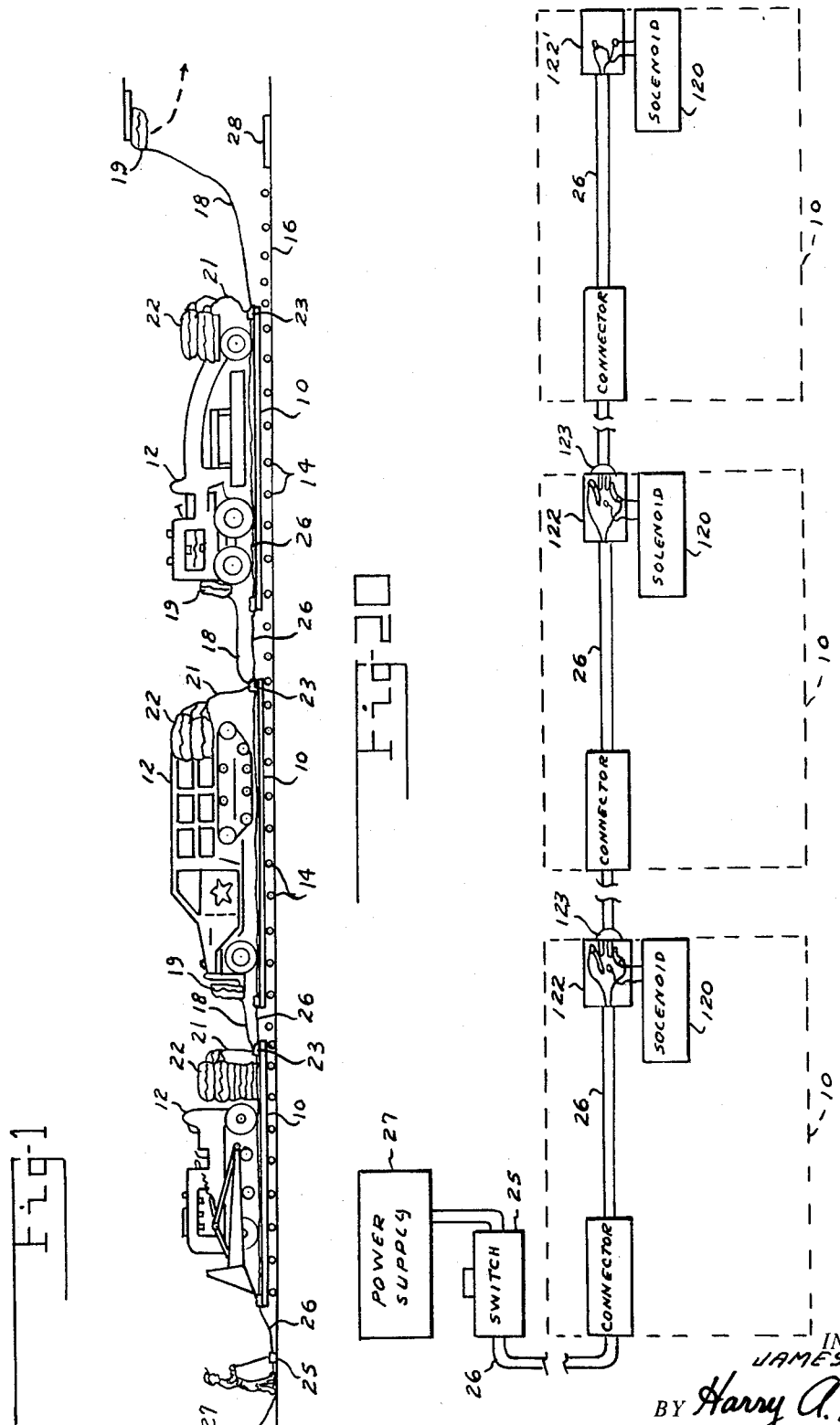

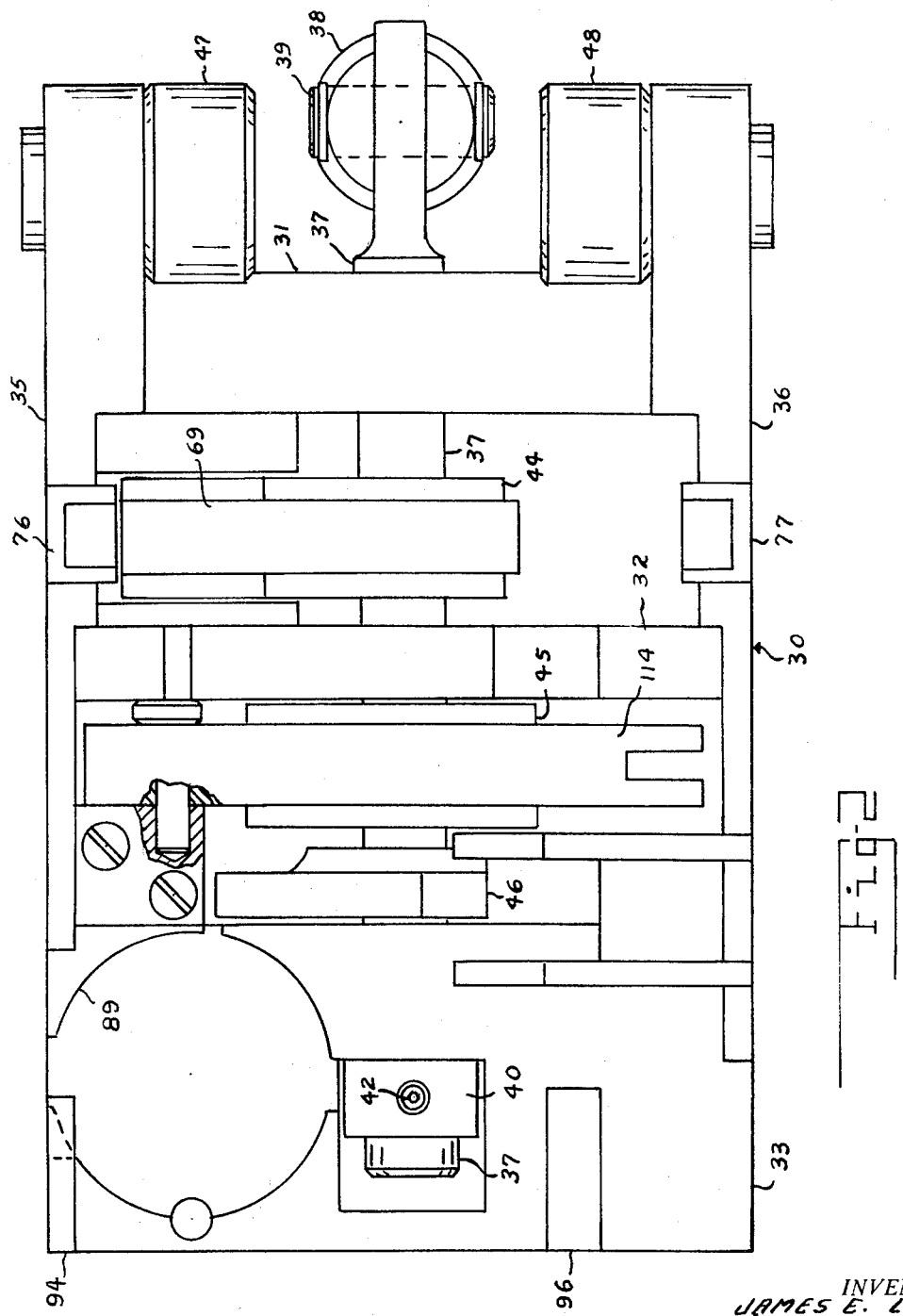

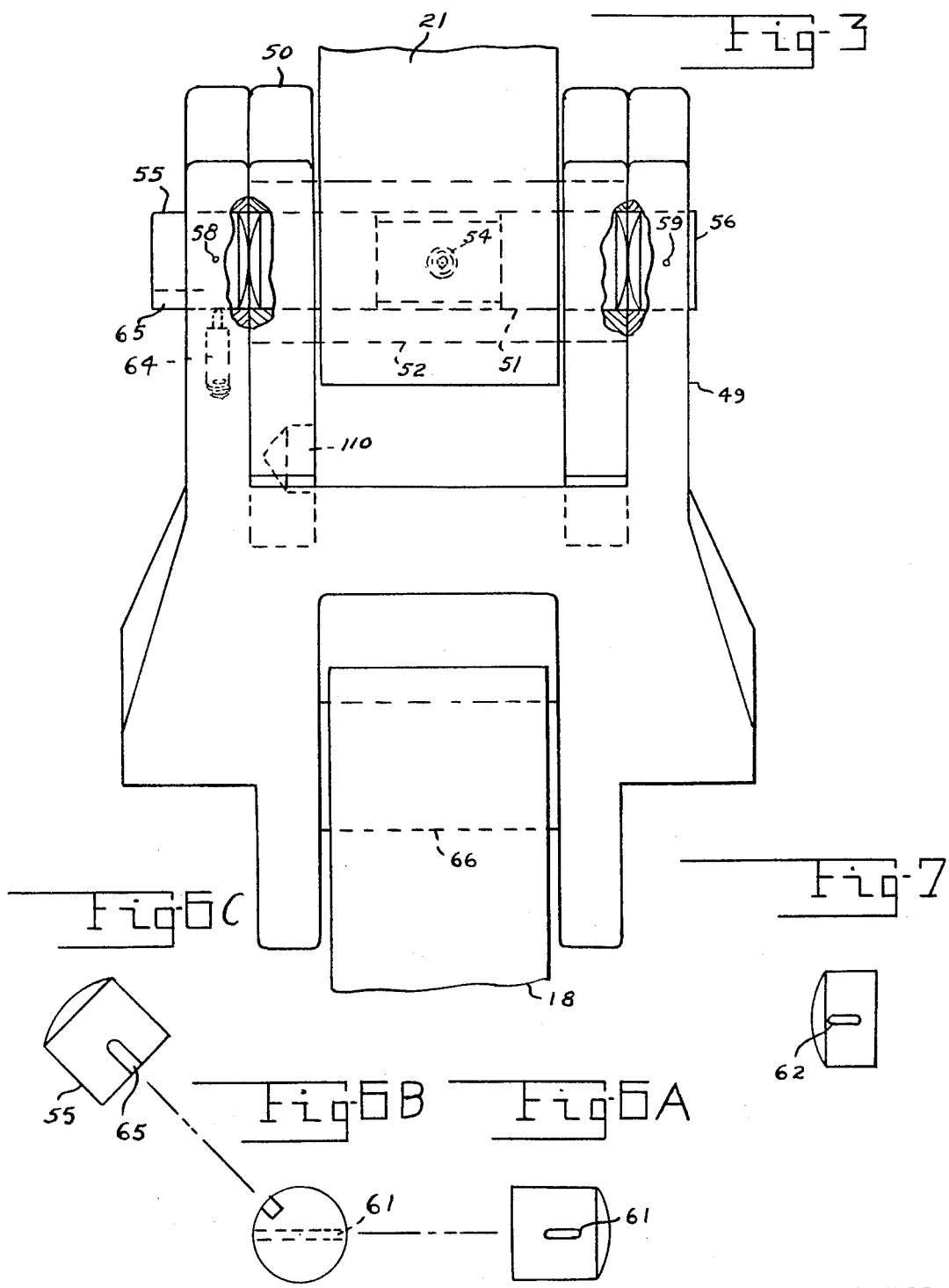

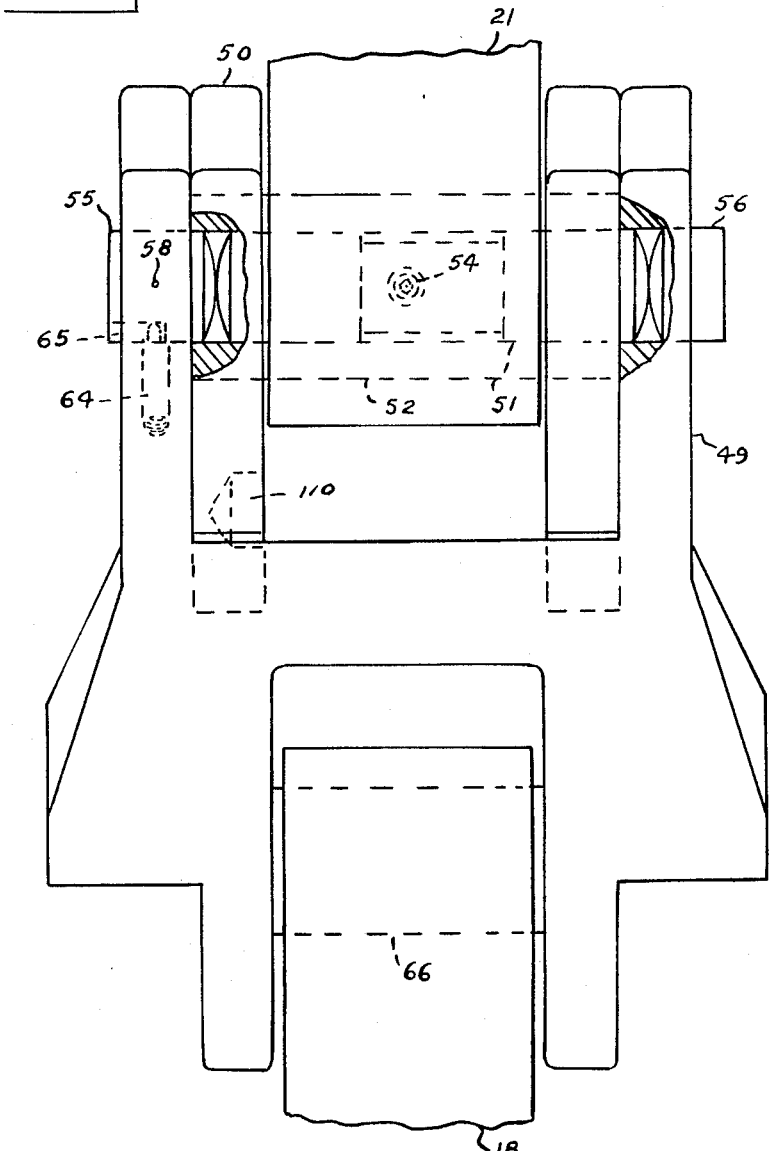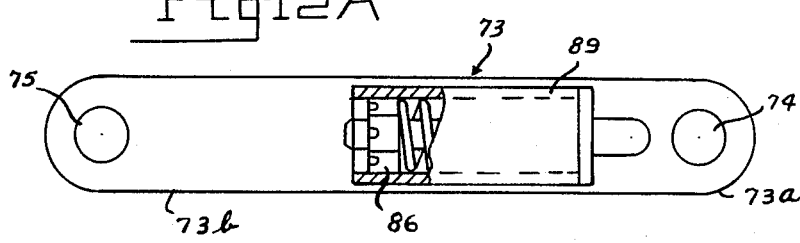

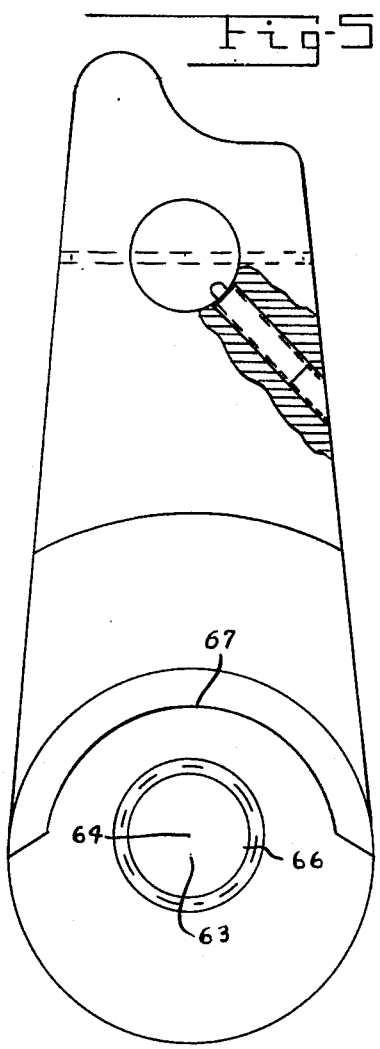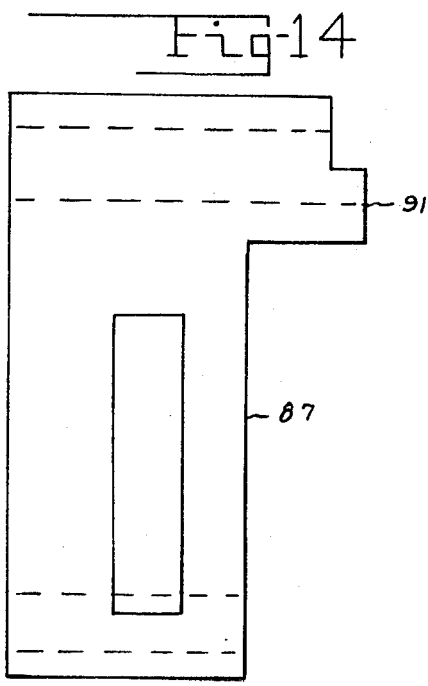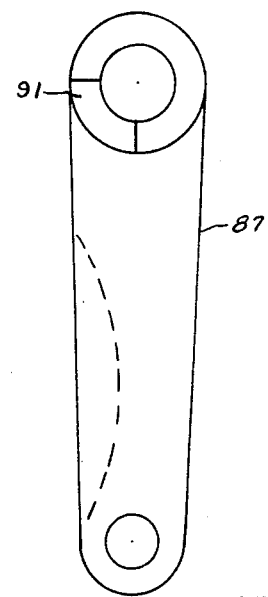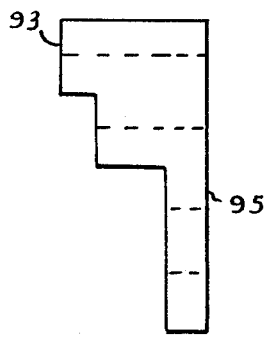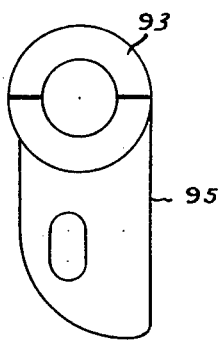

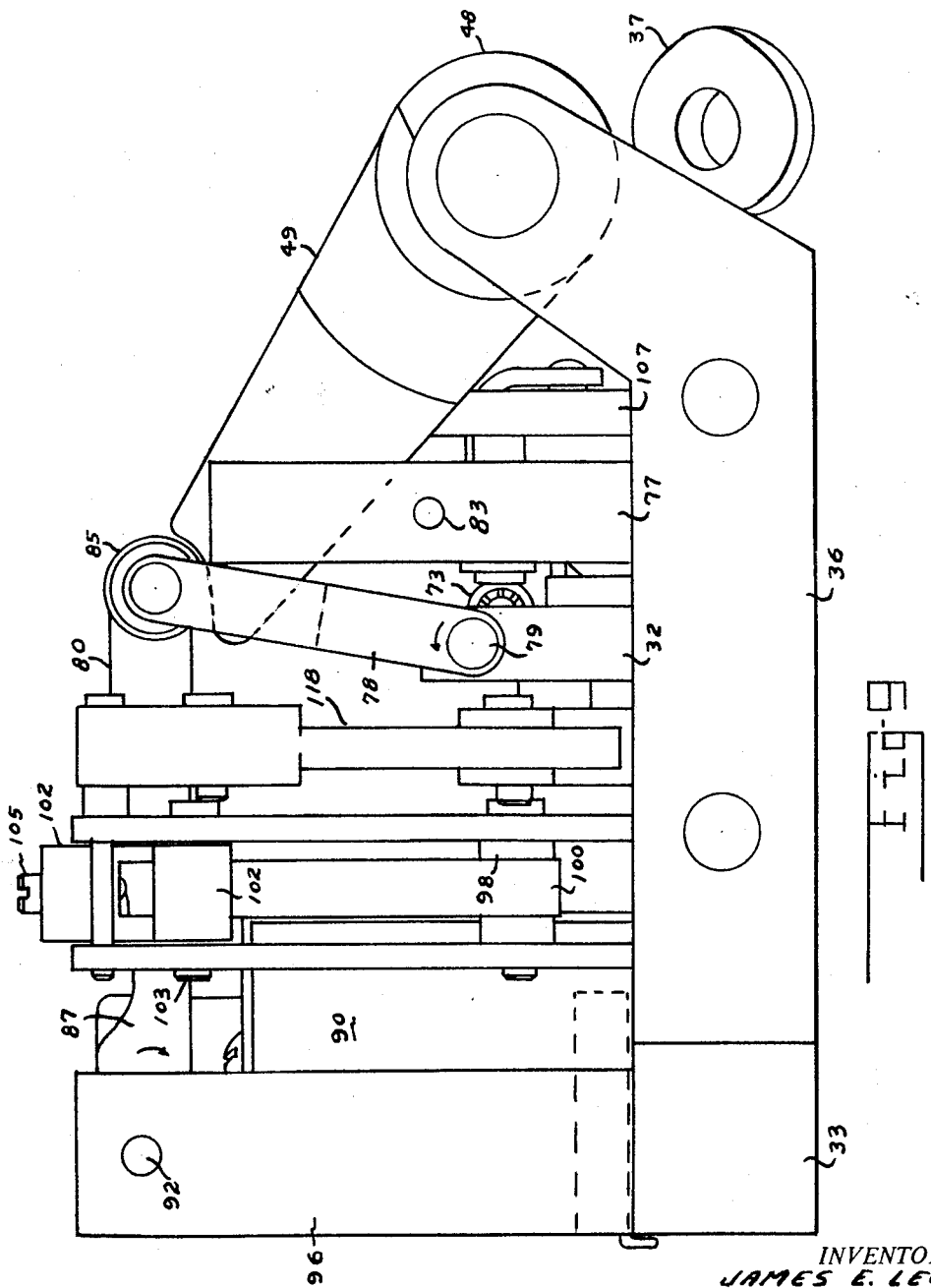

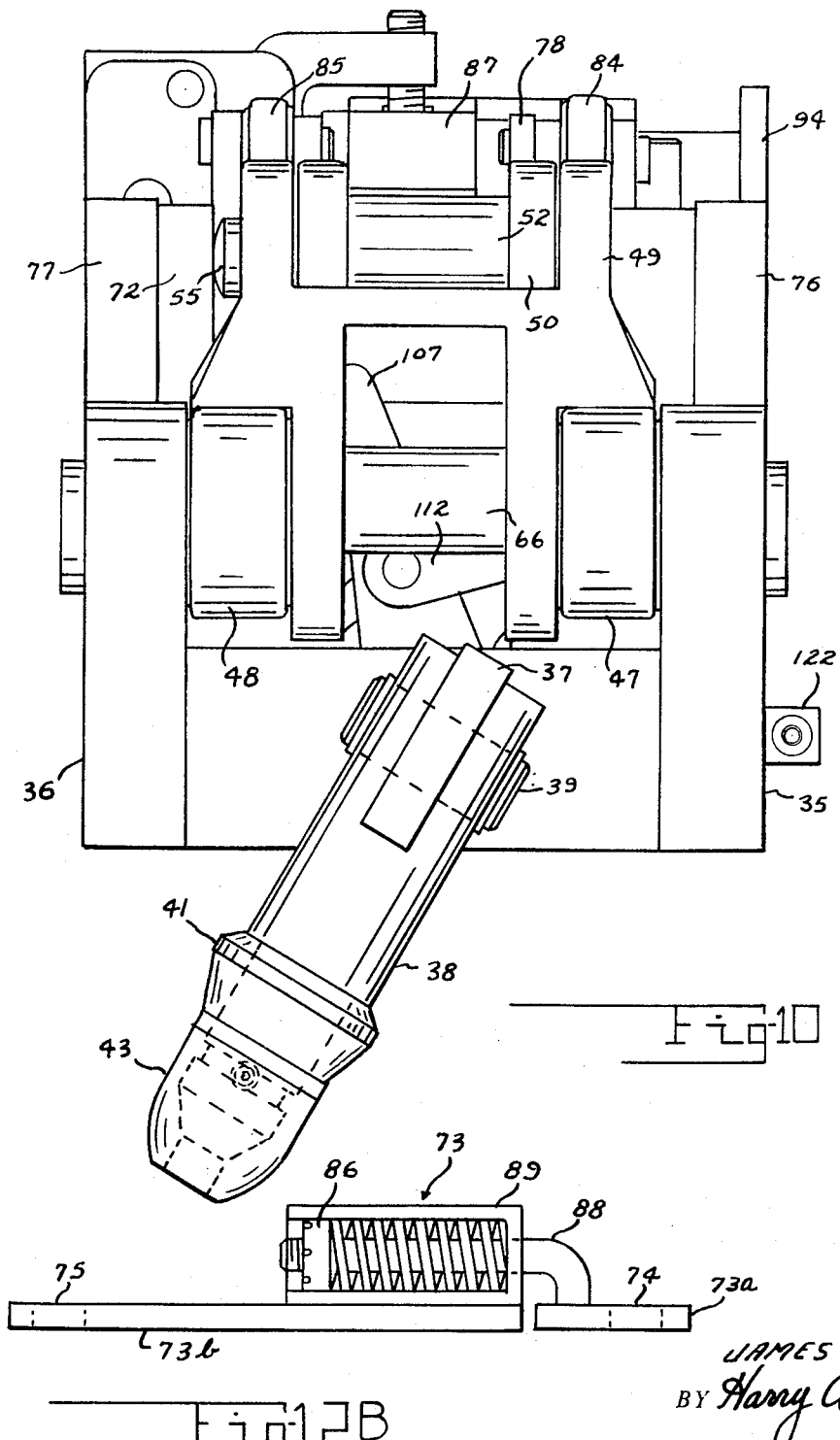

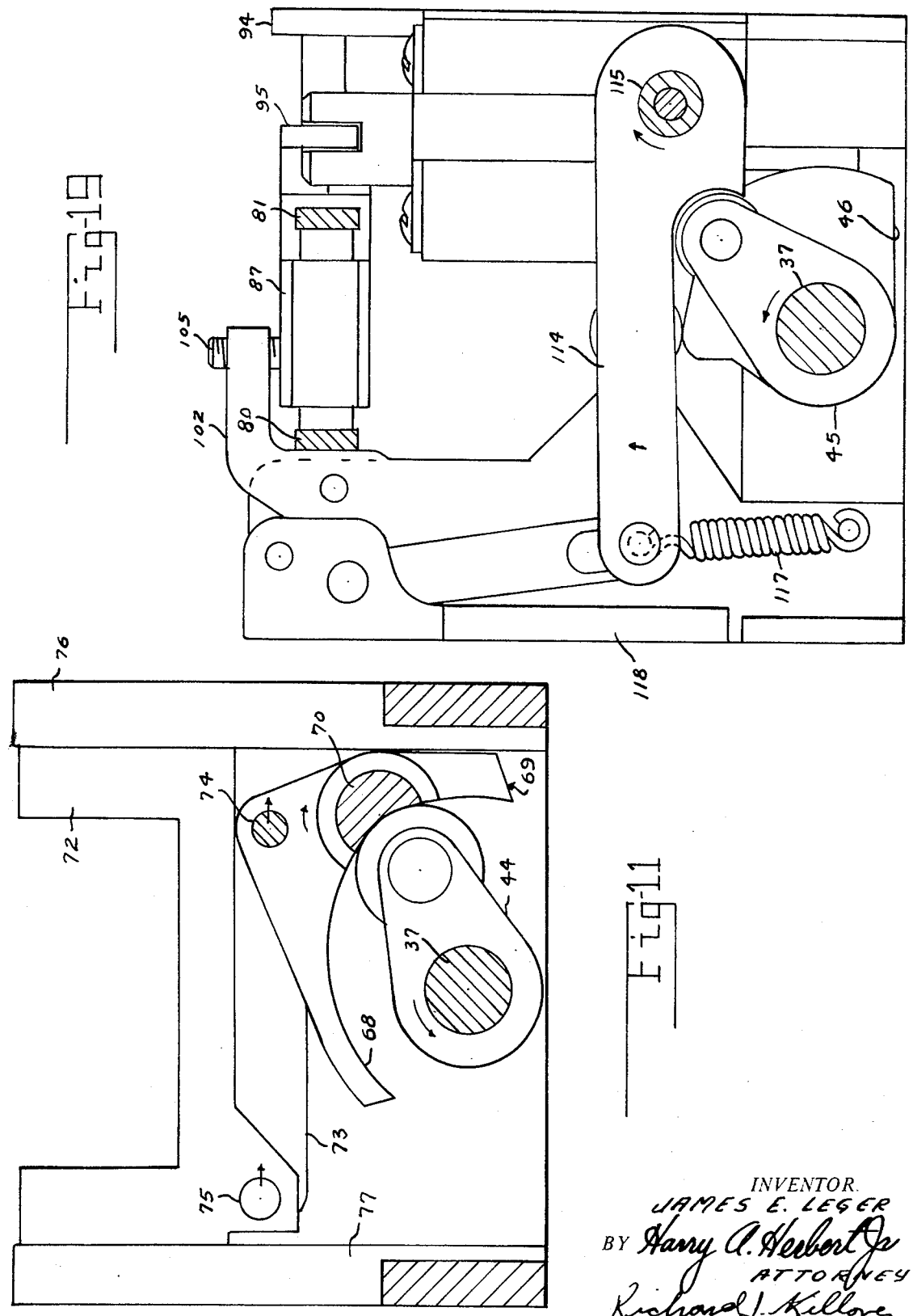

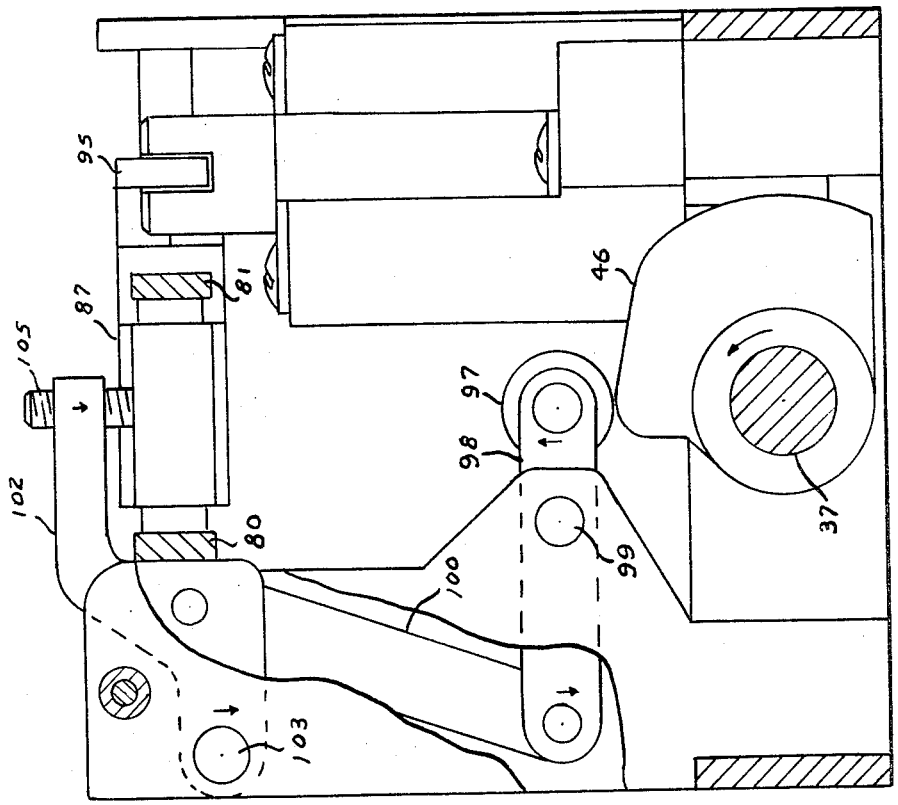
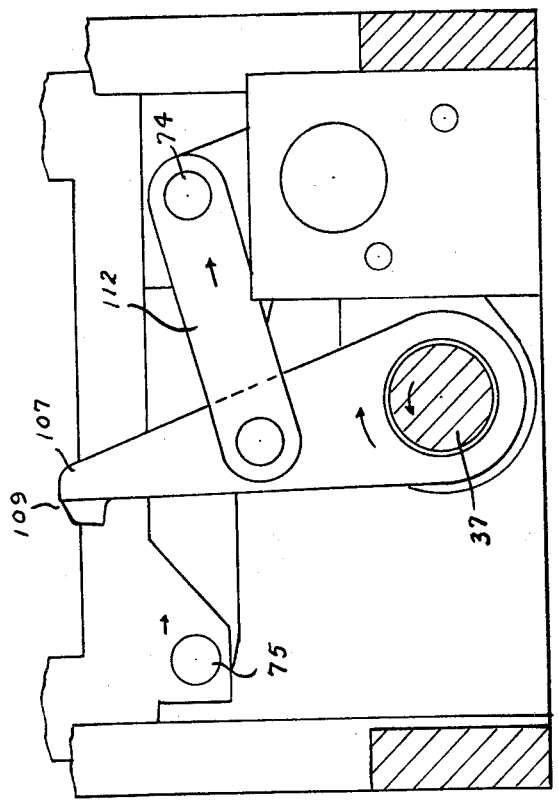

PARACHUTE FORCE TRANSFER MECHANISM WITH BUILT-IN OPEN LINK

BACKGROUND OF THE INVENTION

In the air drop of heavy equipment from aircraft, the equipment is attached to platforms which are latched to the aircraft floor. Normally as each platform is released, from the aircraft floor, the equipment is pulled from the aircraft by an extraction parachute. As the equipment leaves the aircraft the main parachute must be deployed. Also each piece of equipment leaving the aircraft normally acts to deploy the extraction parachute for the next piece of equipment. In the event of malfunction during extraction, such as a floor latch that fails to release, the extraction parachute must be released from the load or an excessive load will be applied to the aircraft. With present equipment it is possible to release the extraction line after the load has reached a point where it cannot be stopped, thus making it possible to drop a load without deploying the parachute which causes great equipment damage.

BRIEF SUMMARY OF THE INVENTION

According to this invention, a force transfer mechanism is provided wherein the extraction parachute is tied to a release which is fixed to the platform. The release has a crank arm which is tripped when it contacts an actuating fixture mounted on the aft portion of the aircraft floor. The crank arm connects the extraction parachute line to the line of the main parachute. A solenoid located in the transfer mechanism may be operated to release the extraction line, in case of a hangup of the platform during extraction. Connector lines are provided between load platforms which permit only the solenoid of the aft most load to be energized to release the extraction line.

IN THE DRAWING

FIG. 1 is a schematic illustration showing a plurality of aerial delivery platform loads with force transfer mechanism of the invention.

FIG. 2 is a top view of force transfer mechanism support frame of the invention.

FIG. 3 is a front view of the connecting links of the force transfer mechanism of the invention, with the connecting pin in the disengaged position.

FIG. 4 is a front view of the connecting links of FIG. 3 with the connecting pin in the engaged position.

FIG. 5 is a side view of extraction parachute link of FIG. 3.

FIGS. 6a, 6b and 6c are views of the left end actuating pin for the device of FIG. 3.

FIG. 7 is a side view of the right actuating pin for the device of FIG. 3.

FIG. 9 is a side view of the device of FIG. 8.

FIG. 10 is a front view of the device of FIG. 8 with the crank arm added.

FIG. 11 is a sectional view of the device of FIG. 8 along the line 11—11.

FIG. 12a is a partially cut away view of the expanding link for the device of FIG. 8.

FIG. 12b is a side view of the device of FIG. 12a.

FIG. 13 is a sectional view taken along the line 13—13 of FIG. 8.

FIG. 14 is a top view of the actuating link for the device of FIG. 8.

FIG. 15 is a right end of the device of FIG. 14.

FIG. 16 is a top view of the solenoid link for the device of FIG. 8.

FIG. 17 is a left end view of the device of FIG. 16.

FIG. 18 is a sectional view along the line 18—18 of FIG. 8.

FIG. 19 is a sectional view along the line 19—19 of FIG. 8.

FIG. 20 is a schematic diagram partially in block form of the solenoid energizing circuit for the apparatus of FIG. 1.

Figure 8:
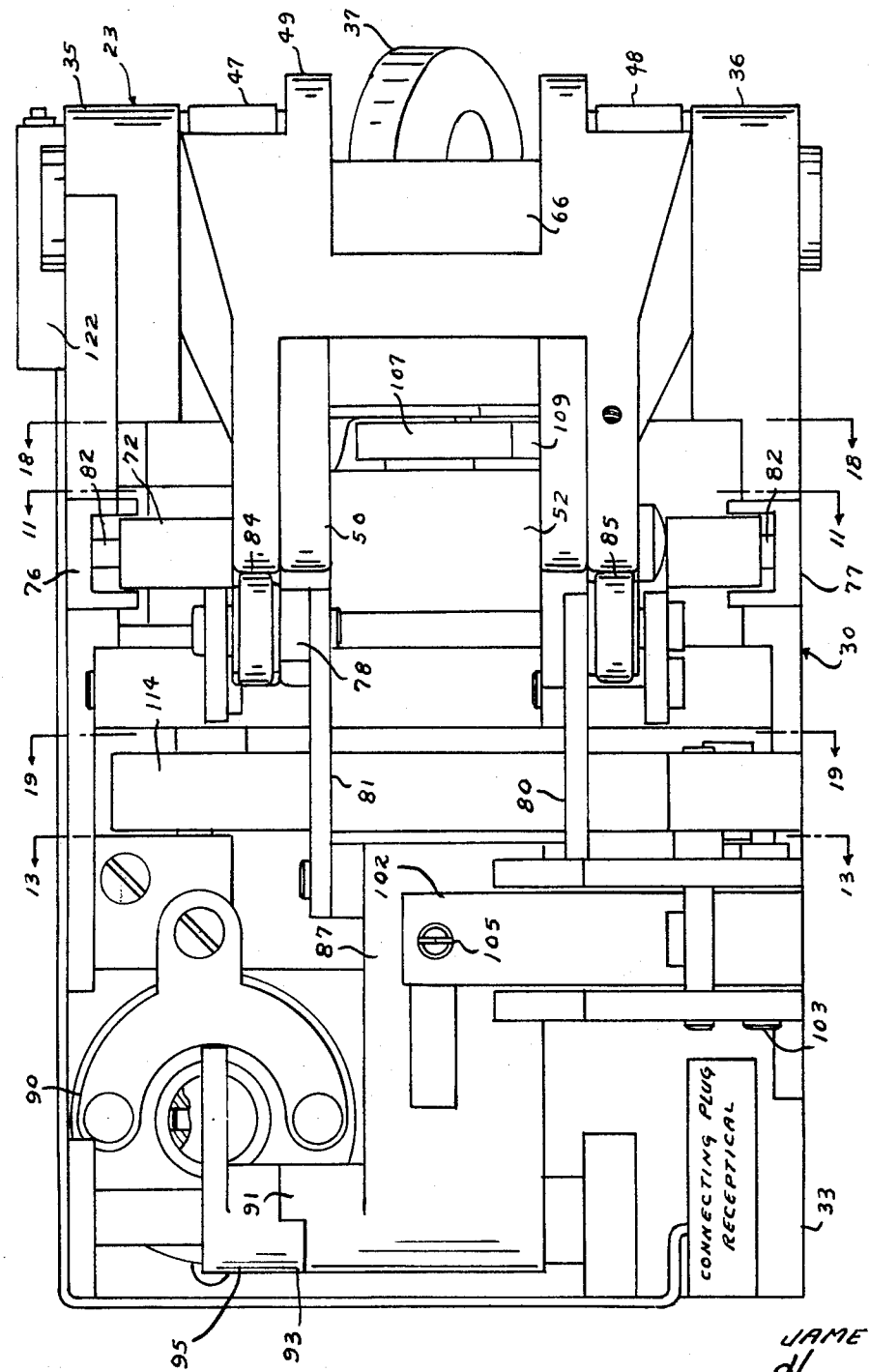
FIG. 8 is a top view of the force transfer mechanism of the invention.

With reference to FIG. 1 of the drawing, a plurality of platforms 10, having heavy equipment loads shown at 12 attached thereto, are located on rollers shown schematically at 14 on the aircraft floor 16. The equipment loads have recovery parachutes 22 connected thereto in the normal manner. Extraction lines 18 of the extraction parachutes 19 are connected to lines 21 on the recovery parachutes 22 by means of force transfer mechanisms 23, as will be described later. The aforesaid force transfer mechanisms 23 are attached to the platforms in a conventional manner. The extraction line 18 may be jettisoned by the load master by operating a solenoid in the aft most load transfer mechanism, if a hangup occurs, by closing of switch 25 in line 26 adapted to connect the solenoids to the power supply 27, as will be explained later. A tripping fixture 28, mounted on the floor of the aircraft near the aircraft exit, acts to connect the recovery parachute line 21 to the extracting parachute line 18 and to release the connecting links.

The force transfer mechanism 23 has a support frame 30 with a front support block 31, and center support block 32, and a rear support block 33 secured by side plate members 35 and 36, as shown in FIG. 2.

A main shaft 37 extends through support blocks 31, 32 and 33 and has a crank arm 38 secured thereto by means of a pin 39. The crank arm 38 engages the tripping fixture 28 on the aircraft floor. Crank arm 38 has a first freely rotating member 41 which can roll on the front of the platform and a second freely rotating portion 43 for engaging fixture 28. A retaining collar 40 is secured to shaft 38 by means of a set screw 42. The shaft 37 has a plurality of cams 44, 45, and 46 secured thereto for operating the transfer mechanism, as will be explained later.

Side plate members 35 and 36 have link bearing support members 47 and 48 secured thereto for supporting links 49 and 50 as shown in FIGS. 8–10.

Link 49, shown in FIGS. 3 and 4, is connected to extraction line 18, and link 50 is connected to line 21 of the recovery parachute 22. The link 50 is nested within link 49 and has a locking pin 51 located in recovery parachute line connecting pin 52. The locking pin is held in link 50 by a pin 54 locking into pin 52. A pair of actuating pins 55 and 56 are secured in link 49 by pins 58 and 59, which fit into elongated slots 61 and 62 to permit movement of the actuating pins between the position shown in FIG. 3 and the position shown in FIG. 4. In the position shown in FIG. 3 the link 49 is free to move out of link 50, whereas in the position shown in FIG. 4 the links 49 and 50 are connected together. The pins are held in the position shown in FIG. 4 by a spring loaded locking pin 64, which engages slot 65 in actuating pin 55. Additional locking pins and slots 64 and 65 may be provided when needed for larger loads. As shown in FIG. 5, the center 63 of the surface 67 for engaging the bearing supports 47 and 48 is displaced from the center 64 for the retaining pin 66 for line 18 so that line 18 will supply the force to remove links 49 and 50 when the links are released by the release mechanism, as will be described below.

Rotation of shaft 37 causes rotation of cams 44, 45, and 46 to provide the motion as shown by the arrows in FIGS. 11, 13, 18, and 19. Cam 44 lifts the arm 68 on pivotable operating mechanism 69 which rotates around shaft 70. An expanding link 73 shown in greater detail in FIG. 12, connects the pivotable operating mechanism 69 at 74 and to a pin carrier 72 at 75. The link 73 has two parts 73a and 73b with an adjustable spring engaging piston member 86 being connected to rod 88 and movable in housing 89. The ends of pin carrier 72 extends into pin carrier guides 76 and 77, which are secured to side plate members 35 and 36. The pin carrier 72 acts to move the actuating pins 55 and 56 from the position shown in FIG. 3 to the position shown in FIG. 4 to lock the links 49 and 50 together. The pin carrier 72 is held in pin guides 76 and 77 by retaining pins 82, but is free to slide on the pins.

The link 49 is held in place by a link retainer 78, which is pivoted at 79 and operated by links 80 and 81. The link retainer has a pair of rollers 84 and 85 which engage link 49.

Links 80 and 81 are operated by an actuating link 87 which is operated either by the cam 46 on a shaft 38 or by solenoid 90, which is held in chamber 89 in support block 33. The actuating link 87 shown in FIGS. 14 and 15 has a 90° projection 91 which mates with a 180° projection 93 on a solenoid operating arm 95 shown in FIGS. 16 and 17. Link 87 and arm 95 are supported on shaft 92, which in turn is supported on shaft supports 94 and 96 which are secured to support block 33. Thus, the solenoid can operate actuating link 87, but movement of link 87 by cam 46 will not affect the solenoid. The actuating link 87 can also be operated by cam 46 in the manner shown in FIG. 13. When cam follower 97 is raised by cam 46 and link 98 pivots around pin 99 to move link 100 down, the rocker arm 102 is moved around pivot pin 103. Adjustable pin 105, which is threaded into rocker arm 102, then presses against actuating link 87 to operate the link retainer 78. Thus, the link retainer 78 can be operated either when the solenoid 90 is energized or when the crank arm 38 operates shaft 37. However, when the link retainer 78 is operated by the solenoid, the actuating pins 55 and 56 and locking pin 51 are in the position shown in FIG. 3, and the link 49 will be released without link 50 which is retained in a manner, as will be described later.

When link retainer 78 is operated by cam 46, the actuating pins 55 and 56 and locking pin 51 are in the position shown in FIG. 4, and links 49 and 50 are released together.

The link 50 is retained when solenoid 90 is operated by a retaining arm 107, shown in FIG. 18 which has a projection 109 that engages recess 110 in link 50, shown in FIGS. 3 and 4. The arm 107 is supported on shaft 37 but is free to rotate thereon. The arm 107 is operated by link 112 connected to pin 74 on the pivot operating mechanism 69. Thus, arm 107 is given an opposite rotation from shaft 37, but is moved out of engagement with recess 110 when shaft 37 is rotated so that links 49 and 50 are connected together and are removed together when shaft 37 is rotated, but are not connected together and link 50 is retained by arm 107 when the solenoid 90 is energized.

To assure that crank arm 38 is in the proper position as the platform leaves the plane, the shaft 37 is held in the proper position by cam 45 and cam retainer arm 114 as shown in FIG. 19. Arm 114, which is pivotable at 115, locks cam 49 in the proper position under the influence of spring 117. Operation of the crank arm 38, however, rotates the cam 45 with shaft 37 and raises the retainer arm 114 to permit rotation of the shaft 37. The spring 117 however continues the rotation of the shaft 37, after the crank arm leaves the tripping fixture 28, so as to move the crank arm 38 up to the opposite side to prevent it being damaged when the load reaches the ground. The fixture has a cam slot that provides a turning motion, followed by a straight line motion to arrest the rotation of shaft 37 before the platform leaves the plane, so that the shaft is moved to its final position only under the influence of spring 117. A manual control arm 118 may be used to lift retainer arm 114 to permit easy operation of shaft 37 without the influence of spring 117.

To insure that the solenoid on only the aft most platform is energized by the closing of switch 25, the solenoids are interconnected in the manner shown in FIG. 20. The solenoids 120 are connected to the line 26 through conventional disconnect type terminal blocks, as shown schematically at 122. When the plug connectors 123 are in place the solenoid is disconnected from the line. When one platform 10 is moved away from the other platform, by the extraction parachute, plug connector 123 is pulled from the terminal block thus closing the contacts in terminal block 122 to the corresponding solenoid 120. The terminal block 122' on the last platform in the airplane does not have to be a disconnect type terminal block but has the line 26 connected directly to the corresponding solenoid 120. Thus, only the solenoid on the aft most platform, connected to line 26, can be energized by closing switch 25 so that a solenoid 120 cannot be energized after plug 123 is pulled from the terminal block.

There is thus provided a release mechanism, to be used in dropping heavy equipment on platforms from aircraft, which will release the extraction parachute from the main parachute in the event of a load hangup, but will prevent the release of the extraction parachute from the main parachute after one platform has moved a predetermined distance from an adjacent platform on being extracted from the aircraft.

I claim:

1. A force transfer device for use in the extraction line between the extraction parachute and the main parachute in aircraft aerial delivery platforms, comprising: a first link member adapted to be connected to the extraction line of the extraction parachute; a second link member adapted to be connected to the extraction line of the main parachute; a two position link interconnection means positioned within said first and second link for leaving the links unconnected in the first position and for interconnecting the first and second link in the second position; means, including a crank arm, adapted to engage tripping mechanism on the aircraft floor near the platform exit, for moving the two position link interconnecting means to the second position and for releasing said links whereby the extraction parachute can deploy the main parachute; means, adapted to be operated in case of a hangup of a platform for releasing only the link connected to the extraction parachute while retaining the link connected to the main parachute to prevent excessive drag loading of the aircraft by the parachute.

2. A device as recited in claim 1 wherein said two position link interconnected means includes a locking pin positioned within the first and second link; a first pin actuating device held by the first link on one side of locking pin and having a portion adapted to extend beyond the outside edge of the first link; a second pin actuating device held by the first link on the other side of the locking pin and having a portion adapted to extend beyond the outside edge of the first link; the junction of the actuating devices and the locking pin being in alignment with the junction between the first link and the second link in the first position and being displaced therefrom in the second position; means in said first link adapter lock at least one of said actuating devices in the second position when the locking pin is moved to the second position.

3. A device as recited in claim 2 wherein the means for moving the two position link interconnecting means and for releasing the links include a shaft connected to said crank arm a plurality of cams secured to said shaft; means responsive to the movement of one of the cams attached to said shaft for moving the first and second pin actuating devices and the locking pin from said first position to said second position when the crank arm is turned by said tripping means; means responsive to the movement of a second cam so said shaft releasing said first and second link members when the crank arm is turned by said tripping means.

4. The device as recited in claim 3 wherein the means for releasing only the link connected to the extraction parachute includes a solenoid; means connected to said solenoid for operating the means for releasing the first and second links; means supported on said shaft and responsive to said one cam for locking the second link in position when the links are released by the solenoid and for releasing the second link when the crank drive is turned by said tripping means to release the links.

5. The device as recited in claim 4, including spring loaded means for engaging a third cam on said shaft for retaining the shaft in a predetermined position except when it is rotated by the crank arm.

6. The device as recited in claim 5 in combination with a plurality of load carrying platforms with a force transfer device secured to the aft portion of each platform; including a cable adapted for connecting the solenoids in each force transfer device to a power supply; a disconnect type terminal in said cable adjacent each force transfer device for disconnecting the cable to each platform as it leaves the aircraft; said disconnect type terminals including means for connecting the solenoid of the adjacent force transfer device to the power supply circuit only when the cable to the next platform is disconnected whereby only the solenoid on the aft most platform can be energized.

* * * * *